(12) United States Patent
Soitu

(10) Patent No.: US 7,112,901 B1
(45) Date of Patent: Sep. 26, 2006

(54) CONSTRUCTION AND METHOD OF AN ELECTRIC MOTOR DRIVE

(75) Inventor: Viktor Soitu, Lappeenranta (FI)

(73) Assignee: Voith Paper Patent GmbH, Heidenheim (DE)

( * ) Notice: Subject to any disclaimer, the term of this patent is extended or adjusted under 35 U.S.C. 154(b) by 709 days.

(21) Appl. No.: 09/889,279

(22) PCT Filed: Nov. 14, 2000

(86) PCT No.: PCT/FI00/00990
§ 371 (c)(1),
(2), (4) Date: Jul. 13, 2001

(87) PCT Pub. No.: WO01/37398
PCT Pub. Date: May 25, 2001

(30) Foreign Application Priority Data
Nov. 16, 1999 (FI) .............................. 19992456

(51) Int. Cl.
*H02K 7/00* (2006.01)
*H02K 33/22* (2006.01)

(52) U.S. Cl. ...................... 310/67 R; 310/256; 310/266

(58) Field of Classification Search ................... 310/51, 310/67 R, 58, 52, 265, 266, 211, 165, 192, 310/20, 255; 187/20; H02K 3/22, 33/22
See application file for complete search history.

(56) References Cited

U.S. PATENT DOCUMENTS 3,355,349 A * 11/1967 Devlin ....................... 162/286
4,574,210 A * 3/1986 Wieland ....................... 310/59
4,761,602 A * 8/1988 Leibovich .................... 310/180
4,771,197 A * 9/1988 Ivanto et al. ................ 187/254
4,868,436 A * 9/1989 Attilio et al. ............. 310/67 R
5,918,728 A * 7/1999 Syverson ..................... 198/788

FOREIGN PATENT DOCUMENTS

| EP | 0582563 | * | 3/1997 |
| EP | 0 582 563 B1 | | 3/1997 |
| EP | 0 617 155 B1 | | 11/1997 |
| EP | 0617155 | * | 11/1997 |
| FI | 811414 | * | 5/1986 |
| JP | 54-122805 | * | 9/1979 |

\* cited by examiner

*Primary Examiner*—Burton S. Mullins
*Assistant Examiner*—Karen Addison
(74) *Attorney, Agent, or Firm*—Taylor & Aust, P.C.

(57) ABSTRACT

In an electric motor drive, a asynchronous motor, such as drum motor, has a stator (2) mounted on a non-rotatory shaft (1) and has rotatory, like by means of bearings (3), connected rotor (4), is arranged to drive the machine construction (actuator). The rotor (4) of the asynchronous motor conveyor's is arranged to be directly a functional part of the machine construction (actuator), like conveyor's (5) driving roll (5*a*). Also the rotor can be formed as a shell of pulley (4) which is part of a vacuum belt conveyor comprising a stationary vacuum box (11), the rotor drive further including a non-rotatory shaft (1) supported by at least one supporting bracket (8) which is connected to the vacuum box.

6 Claims, 5 Drawing Sheets

CONSTRUCTION AND METHOD OF AN ELECTRIC MOTOR DRIVE

BACKGROUND OF THE INVENTION

1. Field of the Invention

The present invention relates to an electric motor drive and a method for the construction of an electric motor drive, and, more particularly, to an asynchronous motor, which has a stator mounted on a non-rotatory.

2. Description of the Related Art

Asynchronous, compact drum motors have been presented in publications EP 0 582 563, U.S. Pat. No. 4,868,436 and FI 811414. The first mentioned solution in these publications is carried into effect by keeping separate and individual copper short-circuit bars in position by pressing them in place with collars mounted on the end flanges of a motor.

The disadvantage of this arrangement is the poor heat transmission from the short-circuit bars to the rotor shell. Further, U.S. Pat. No. 4,868,436 discloses a rotor structure built up of a so called active part (i.e. electric plate package) and at least two separate rotor shell parts (i.e. support flange) and onto it by means of a screw coupling connected rotor shell, which makes the arrangement unnecessarily complicated. In application publication EP 0 617 155 there is a much similar solution (of above mentioned U.S. patent), where a motor's rotor package, is constructed/laminated of electric plates, and is connected together with short-circuiting conductors to a drum roller by means of a screw/press coupling, which operates as a roll surface. This solution is disadvantageous especially in manufacturing.

Further, in Finnish patent application 811414 there is presented a drum motor, which is designed especially for elevator purposes. In this application a separate roller with cable grooves, a brake surface area, for elevator's lifting cables, and brakes are mounted on the upper shell of the rotor. The motor cooling is provided by machining radial ventilation holes in the roller and stator and to blow cooling air into the holes with a separate blower.

Relative to the above-mentioned approaches it is common for the actuator's connection to the drum motor to require special mounting arrangements and/or extra parts for a separate drive roll to be assembled onto an electrical motor's rotor (EP 0 582 563), a firmly assembled flange arrangement on the motor's frame (U.S. Pat. No. 4,868,436) or a shell to be assembled outside the drum motor (FI 811414 and EP 0617 155 A1). The motor constructions in the above-mentioned innovations provide for cooling circulation to be carried out by traditional means. Thus, it is not possible to reach higher outputs than with a standard drum motor.

What is needed in the art is an electric motor drive and a method of constructing an electric motor drive which will provide a higher output.

SUMMARY OF THE INVENTION

The present invention provides an electric motor and a method for constructing an electric motor with a higher output. It is principally distinctive to the construction of the electric motor of this invention, that the functional part of the motor's construction, the actuator, such as a conveyor's driving roll, is arranged to operate by having a short-circuit arrangement as the rotor of the asynchronous motor. In other words, the actuator (e.g. driving roll) is formed so as to constitute the rotor of the asynchronous motor, with the actuator being the short-circuit arrangement.

The construction according to one embodiment of the invention is characterized by the functional part of the machine construction, the actuator, such as a conveyor's driving roll, being arranged to operate by having a short-circuit arrangement as the rotor of the asynchronous motor.

It should be noted that the arrangement of the actuator being the short-circuit arrangement is referring to many various embodiments. In the most simple embodiment, the actuator is formed as a one-piece solid roll shell being free from short-circuit bars and rings and also being free from laminated elements.

In another embodiment (also being free from laminated elements) short-circuit bars and rings are provided. Each of the bars and the rings are located within the roll shell, preferably with a tight or positive fit being provided between each bar and the roll shell, whereby additional mounting elements (e.g. collars and/or screws) are not needed.

The most important advantages of the construction of this invention is the simplicity of its construction, manufacturing and usage, its efficiency and reliability of working, and the most integrated and compact machine configuration possible. This configuration allows higher output and higher torque from the asynchronous massive rotor and a significant improvement in its performance in other ways as well.

The simplicity of the construction of this invention is based on the fact that there is no need to use traditional short-circuiting conductors, since the short-circuit arrangement is established directly in the functional part of the machine construction of the actuator, such as a conveyor's driving roll. On the other hand the structure of this invention makes is possible to use traditional short-circuiting connectors in a new way, so that they are located internal to a functional part of the machine construction (actuator) as the rotor shell, such as a conveyor's driving roll. The asynchronous motor is equipped with primary and secondary cooling circulation to cool both the stator and the rotor. Cooling fluid is carried through the stator shaft and with the help of holes in the shaft as a parallel flow through the flow system in the rotor shell.

As a further improvement, the rotor is manufactured of an electrically conductive compound metal structure, where copper short-circuit bars or pipes and rings are explosion welded into pre-drilled/machined holes/slots. On the other hand during manufacturing of the asynchronous motor it is also possible to utilize a casting technique.

A further embodiment of the present invention, is to assemble the stator on the hollow shaft/pipe which also serves as a stator shaft, that is used to feed over-pressure cooling air. This is effectuated by using a hermetic primary cooling method which is known from EP 0 617 155 and which prevents dirt from penetrating into the drum motor, which is not possible with the conventional, free breathing air-cooled solutions.

A further embodiment of the present invention, provides for short-circuit hollow bars or pipes to be positioned within the rotor shell, functioning as secondary cooling channels. Thereby making it possible to carry cooling air to the hottest spots of the rotor, which helps both to obtain the maximum output and to increase the amount of starts/stops the (actuator) equipped with the motor is capable of.

The method according to another embodiment of the present invention is characterized by the functional part of a machine construction, an actuator, such as a conveyor's driving roll, being arranged to operate by having a short-circuit arrangement as the rotor of the asynchronous motor.

Important advantages of the method of this invention are the simplicity of the operating principle, the simple constructions which makes it possible, the reliability of the device, the compact machine construction (actuator) which integrates an asynchronous motor to achieve high mechanical load capacity, vibration strength, and high starting and operation torque features. The simplicity of the method of this invention is based on the fact that there is no need to use a separate laminated rotor component with traditional short-circuiting conductors inside a functional part of the machine construction, rather a short-circuit arrangement is integrated directly into the functional part of the machine construction (actuator), such as a conveyor's driving roll. The method of this invention makes it possible to utilize traditional short-circuiting connectors, located essentially internally on a functional part of the machine construction (actuator) as the rotor shell, such as a conveyor's driving roll.

An advantage of this innovation, makes it possible to increase an air gap diameter between a stator and a rotor once a maximum outer diameter and total length of a drum motor is limited. Thus by this innovative design it is possible to get higher output power and higher torque as compared to an asynchronous drum motor having the same main dimensions as this new innovative drum motor construction and having a standard laminated rotor component inside a rotor shell.

A further advantage of this method is the minimization of the manufacturing costs of the massive motor by manufacturing the rotor and the associated slots from cast steel.

A further advantage of this method is that the asynchronous motor is cooled effectively allowing a higher output than with conventional motors. This invention provides an hermetic seal and an axially directed cooling fluid flow through the asynchronous motor which makes possible the directing of cooling air to the hottest spots of the rotor, which in turn allows an increase in the maximum output and an increased number of starts/stops. In contrast to freely breathing air-cooled motors, the present invention prevents filth from penetrating into the drum motor structure.

Cooling of an asynchronous motor with a solid rotor can be realized either with or without a secondary cooling arrangement of hollow bars or tubes inside a functional part of the machine construction (actuator) such as the rotor shell. In constructions without a secondary cooling arrangement the cooling is taken care of only with a primary cooling arrangement such as an air flow arrangement through an air gap between an inner surface of a rotor shell and an outer surface of a stator component.

Furthermore, it is important that the short-circuit bars and rings are arranged essentially integral with rotor shell, at least partly or even totally, with internal arrangements. Such an arrangement provides for a much more efficient heat transfer between the steel shell and the copper short-circuit bars and rings than can be accomplished with traditional solutions. This also allows for higher output and an increase in the number of starts and stops of the asynchronous motor within a time interval.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawing(s), wherein.

Figure 1:
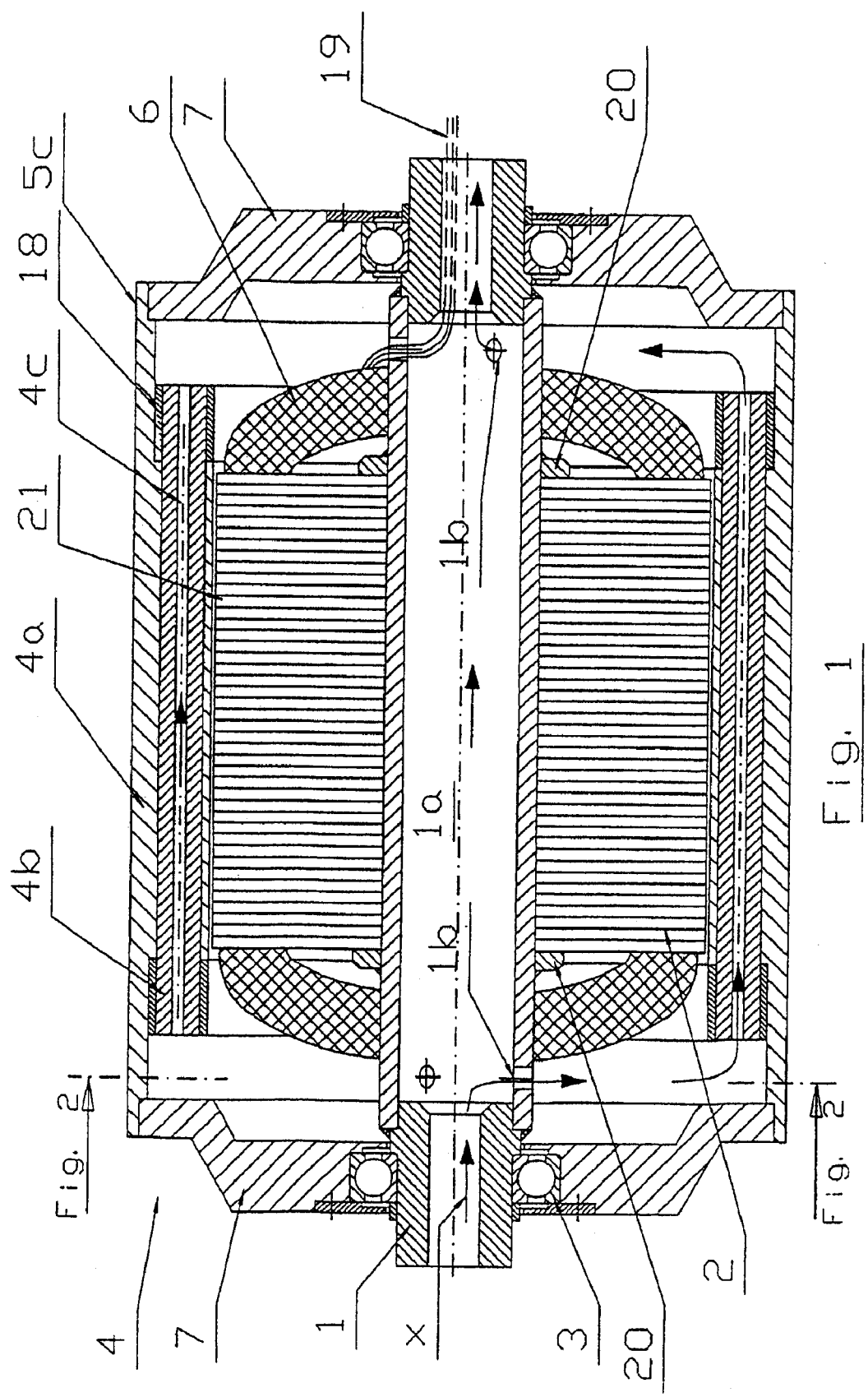
FIG. 1 is a longitudinal cross-section of a typical machine construction (actuator) unit, which is accomplished with the method in this invention.

Corresponding reference characters indicate corresponding parts throughout the several views. The exemplification(s) set out herein illustrate(s) one preferred embodiment of the invention, in one form, and such exemplification(s) (is)(are) not to be construed as limiting the scope of the invention in any manner.

DETAILED DESCRIPTION OF THE INVENTION

Figure 2:
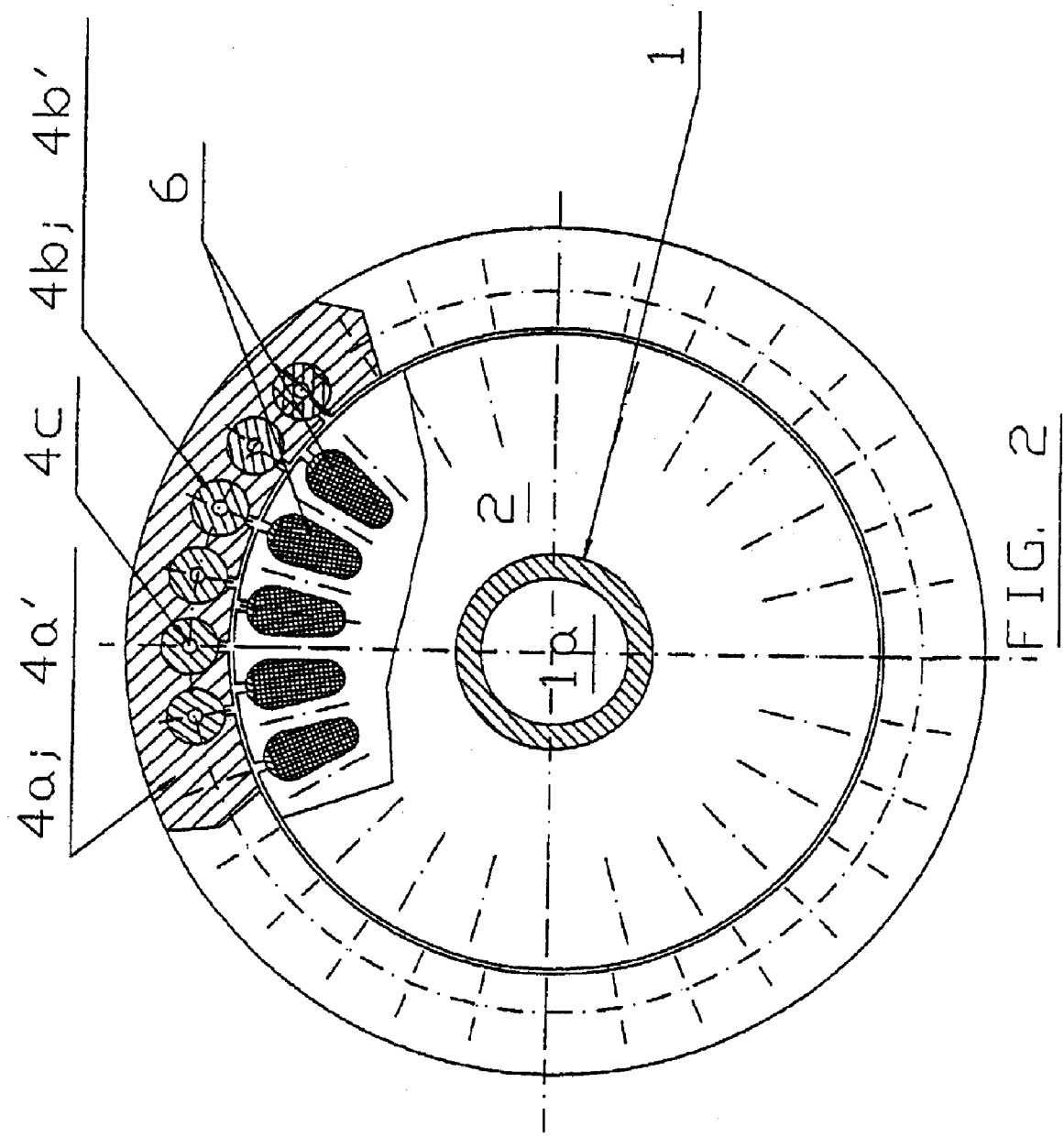
FIG. 2 is a cross-sectional profile of a section along line "FIG. 2—FIG. 2" in FIG. 1.
Figure 3:
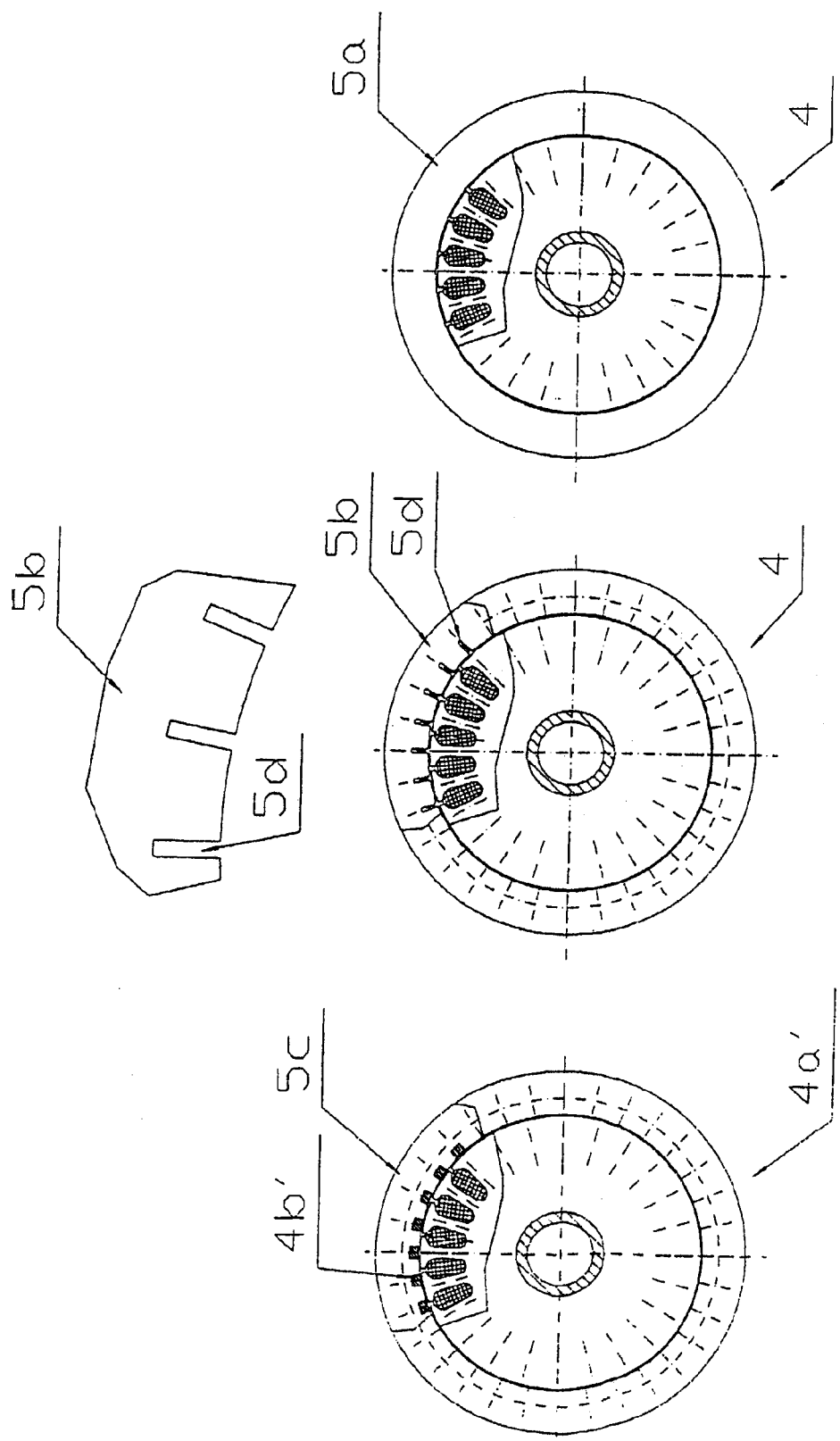
FIGS. 3a–c present some alternative massive motor constructions of a drum motor.

Referring now to the drawings, and more particularly to FIGS. 1–3, there is shown the construction of an electric motor drive. The electric motor drive being a so called solid asynchronous motor, which has stator 2 mounted on non-rotatory shaft 1 and around stator 2 is rotor 4, which is, by means of bearings 3, rotatably connected on shaft 1 and having a short-circuit arrangement is designed to drive a machine construction (actuator). The functional part of the machine construction (actuator), such as conveyor's 5 (FIG. 4) driving roll 5a, 5b or 5c, is designed to operate by an integrally connected short-circuit arrangement of rotor 4 of the asynchronous motor. FIG. 3c shows the most simple embodiment of the invention, in which conveyor's driving roll 5a is realized with a solid shell. Driving roll 5a operates directly as the short-circuit arrangement of rotor 4 without any traditional laminated rotor component having short-circuit conductors (e.g. short-circuit bars and rings). An alternate embodiment of this principle is shown in FIG. 3b, where driving roll 5b is designed to operate as the rotor of the asynchronous motor with the solid shell having on its inner surface drilled or machined holes or grooves 5d.

Different from FIGS. 3b and 3c, the invention may be advantageously used in connection with the structure, where the short-circuit arrangement is realized in rotor's shell 4a with short-circuiting conductor bars 4b and rings 18. In this embodiment of the present invention short-circuiting connector bars 4b and rings 18 are arranged to operate at least partly internally of rotor's shell 4a operating as a functional part of the machine construction (actuator), such as conveyor's driving roll 5c. Examples of this embodiment as shown in FIG. 2, where round short-circuit bars 4b are used and in FIG. 3a where quadrangular short-circuit bars 4b' are used in rotor shell 4a'. Bars 4b as shown in FIG. 2 may be hollow, so that each bar includes a channel 4c for piping cooling fluid. At each end, of shell 4a, a flange 7 is provided which connects the shell to one of the bearings 3.

Referring now to FIG. 3a there is shown yet another embodiment of the invention, where conveyor's driving roll 5a is realized by a solid shell having quadrangular short-circuit bars on its inner surface. This type of electrical motor design should be used when a compact drum motor constructions (e.g. maximum outer diameter and total length of the drum motor are limited) with high output power and torque are desired. Such a compact drum motor is needed in vacuum belt conveyors used for "tail threading" in paper machines.

A typical design of drum motor's stator component 2 consists typically a pile of 0.3–1.0 mm thick electrical sheets 21 which are mounted on stationary hollow shaft 1 and fixed at their position by spot welding stator end plates 20 to stationary hollow shaft 1. Stator windings 6 are connected via electrical connection cable 19 to an external electric grid.

Figure 4:
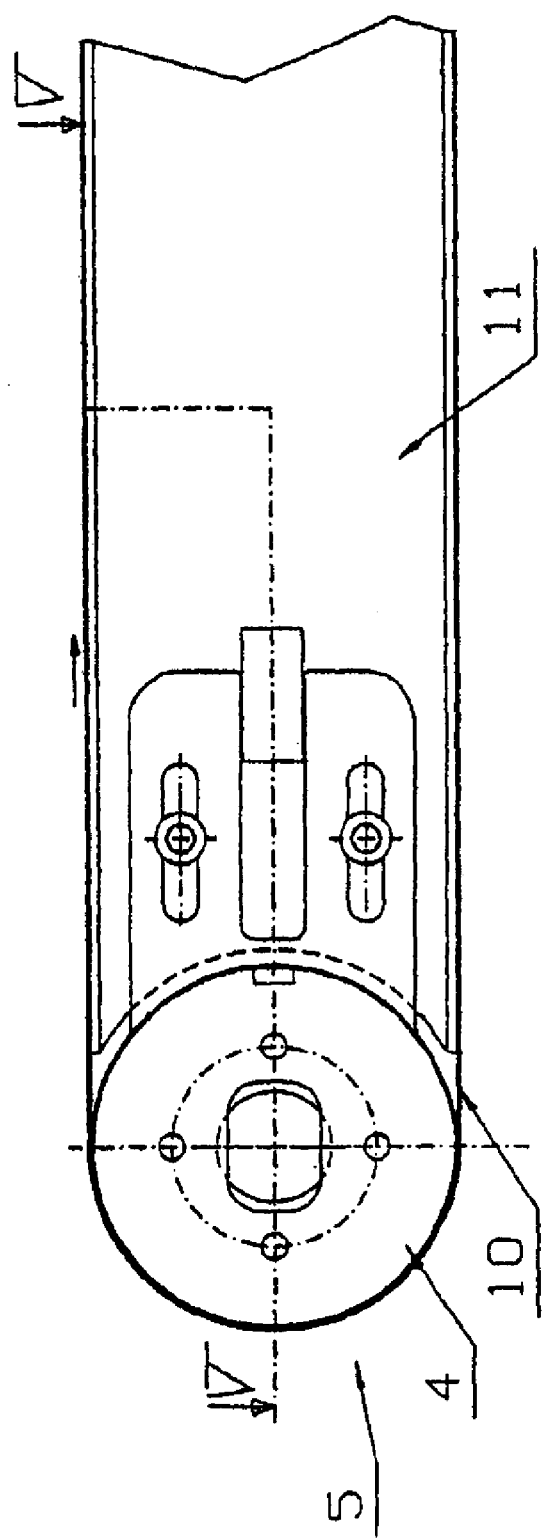
FIGS. 4 and 5 is a drum motor designed according to one embodiment of the present invention and integrated to one end of a vacuum belt conveyor construction, with FIG. 5 being a section along line V—V of FIG. 4.
Figure 5:
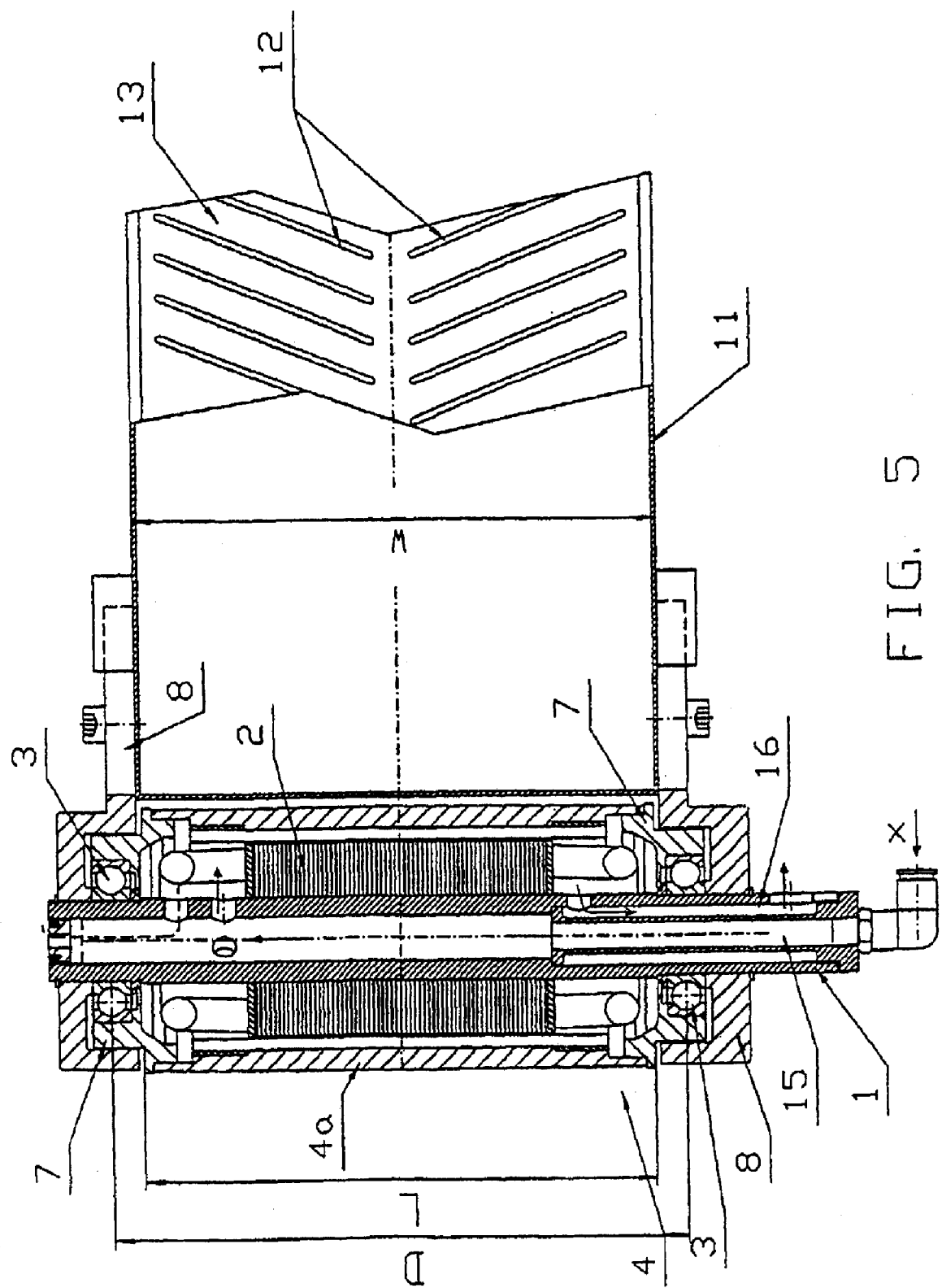

Referring now to FIGS. 4 and 5 there is shown one end of a vacuum belt conveyor including an endless air pervious belt 10 which travels across two rotary pulleys, only one pulley 4 being shown. The pulleys are supported by vacuum box 11. Therein a negative pressure is created by vacuum source (not shown). The negative pressure propagates through openings 12 of cover plate 13 and through belt 10 in order to convey a web of paper or similar material, in particular a lead strip or "tail" which has been separated from threading purposes (see e.g. U.S. Pat. No. 3,355,349).

In order to drive belt 10, pulley 4 is designed as the rotor of an electric motor drive according to the present invention. Similar to FIG. 1, stationary hollow shaft 1 supports stator 2 and (by means of bearings 3) rotor 4, which is pulley 4 of the vacuum belt conveyor and which comprises rotor shell 4a and two end-flanges 7.

Width W of conveyor 5 (and also length L) of the pulley's shell 4a should be relatively small, about 0.25 m. The pulley's 4a diameter should preferably be less than 0.15 m. The speed of belt 10 should be about the same as the operating speed of modern paper machines which may exceed 2000 m/min. Therefore, there is a need for very high motor output while the dimensions of the motor drive should be relatively small.

To fulfill these demands, distance D between the bearings 3 is larger than length L of pulley's shell 4a, in order to increase the internal space being available for stator 2 and for the short-circuit arrangement of rotor 4. As a consequence, each flange 7 is formed as a bushing which bridges the difference between length L and distance D. Furthermore, each of supporting brackets 8 which connect stationary shaft 1 to the side walls of vacuum box 11 is formed similar to a "z" (in other words: it is "double folded"). In addition, each support bracket 8 may be wrapped around the periphery of one of flanges 7.

In order to improve the cooling effect, hollow shaft 1 comprises at one of its ends an internal (e.g. coaxial) supply channel 15 as well as a discharge channel 16, as a result, cooling fluid X must pass the inner side of stator 2 as well as its outer side and the inner side of rotor 4 (plus the channels 4c, if existing, in bars 4b as shown in FIG. 1).

The above-mentioned supporting brackets 8 can also be used as a connection surface for vacuum belt conveyor's accessories (e.g. knife plates, rotary ripper and choppers) (which are not shown in the drawings).

In addition to the foregoing, the cooling of the machine construction (actuator) operating as rotor 4 of a asynchronous motor is realized mainly with primary cooling by carrying over-press cooling air X in an axial direction through stator shaft 1, which can be for example a hollow shaft, pipe or similar device and stator shaft 1 is equipped with a first flow arrangement 1a. It is possible to boost the cooling of the asynchronous motor beyond what is described above or instead of it by way of secondary cooling which employs short-circuiting bars 4b' with flow arrangement 4c. Then, it is possible to carry cooling air X in an axial direction through hollow copper short-circuit bars 4b, according to the principle in FIG. 1 with the help of holes 1b in stator shaft 1 together with primary air flow 1a which take place together with the parallel flow to the hottest spots of rotor 4, which enables a higher output from the machine construction (actuator) and especially to allow more short run starts/stops.

Once an asynchronous motor has a solid rotor's cross section as shown in FIGS. 3a, 3b and 3c, cooling is taken care of by an air flow arrangement through an air gap located between an inner surface of a rotor shell 5a, 5b, 5c and an outer surface of stator component 2.

Yet another embodiment of the present invention is to manufacture the rotor of electrically conductive compound metal structure, where copper short-circuit bars 4b; 4b' are integrally connected to steel rotor shell 4a; 4a' for example by explosion welding or by centrifugal casting.

It is possible with asynchronous motor, realized according to the invention, when using star type coupling for windings, to get the output of the drum motor equipped with three, four, or six pole stator windings which reach the 0.5–500 kW level and to have the speed of rotation typically in the area of 0–20000 rpm.

Yet still a further embodiment of the present invention (which is not shown in the drawings) there may be provided a frequency transformer for use by the asynchronous motor, which is equipped with active rotation speed control. In this embodiment rather traditional solutions can be used to achieve the desired effect.

And, in yet another embodiment of the present invention is a method with an electric motor drive, where the machine construction (actuator) uses an asynchronous motor, such as a drum motor, which has stator 2 mounted on non-rotatory shaft 1 and around stator 2 is rotor 4, which is rotatable, having bearings 3, connected on shaft 1 and with a short-circuit arrangement. The functional part of the machine construction (actuator), such as a conveyor's 5 driving roll 5a, is arranged to operate by having a short-circuit arrangement as rotor 4 of the asynchronous motor (typical constructions shown in FIGS. 2 and 3a). The method according to this principle is applied in the simplest way in constructions as shown in FIG. 3b, wherein driving roll's 5b machined grooves/slots 5d are arranged as the short-circuit arrangement. On the other hand in FIG. 3c is a similar type of solution without traditional short-circuit bars, wherein driving roll 5a is realized as a solid shell, which operates directly as the short-circuiting arrangement.

As a further embodiment of this method it is advantageous to benefit the machine construction with an asynchronous motor, whose short-circuit arrangement is connected to rotor 4, such as short circuiting bars 4b and rings 8 which are supported on rotor's shell 4a. In this connection short-circuit bars 4b and rings 8 are arranged to operate at least partly internally to shell 4a of rotors 4 of the operating functional part of the machine construction (actuator), such as conveyor's driving roll 5a. In this embodiment as presented, in FIG. 2, showing round short-circuit conductors 4b and further in FIG. 3a showing quadrangular short-circuit bars 4b'.

Furthermore, referring to FIG. 1 this method can be used with an asynchronous motor which is arranged to be cooled with a fluid flow. The cooling of the asynchronous motor is realized as a closed system by carrying a cooling fluid, such as over-press cooling air X, hermetically in an axial direction in primary flow arrangement 1a through stator shaft 1 such as a hollow shaft, pipe or similar device. The cooling of the asynchronous motor can be arranged in a manner other than that describe above by carrying a cooling fluid, such as over-press cooling air X hermetically in an axial direction in a secondary flow arrangement 4c provided in short-circuit conductors 4b such as hollow bars or pipes.

Referring to FIG. 1, rotor 4 of the solid asynchronous motor is manufactured of an electrically conductive compound metal structure, with copper short-circuit bars 4b which are welded, such as explosive welded or butt welded, into the holes in steel rotor shell 4a or that they are cast integral using a casting method, such as a press casting method. The above-mentioned methods utilize an assembly wherein every short-circuit bar 4b and ring 18 is integrated as an integral part of rotor shell 4a. This arrangement allows better heat transmission between the steel shell and copper short-circuit conductors. This fact is of great importance when trying to get higher maximum power from the machine constructions (actuators) than with traditional solutions and especially when short run starts/stops are numerous. The same is true with the embodiment shown in FIG. 3a comprising rotor shell 4a' and bar 4b'.

It is obvious that this invention is not limited to the above-mentioned or explained solutions, it can be considerably modified within its basic idea. Thereby it is possible to utilize the construction or arrangement of this invention in different manners, whereupon the dimensions and constructions can considerably differ from the hereby presented example drawings. Further, other types of fluids can be used in the cooling of the asynchronous motor realized according to the invention or the cooling can be done differently from what is presented above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electric motor drive, comprising:
   a stator;
   a non-rotary shaft carrying said stator;
   a plurality of bearings connected to said non-rotary shaft;
   a stationary vacuum box;
   at least one supporting bracket being attached to said stationary vacuum box, said non-rotary shaft being attached to said at least one supporting bracket;
   a rotor rotatably positioned around said stator, said rotor being rotatably carried by said bearings, said rotor being configured as a shell of a vacuum belt conveyor pulley; and
   a machine actuator having a functional part with a short circuit arrangement associated with said rotor for operating said actuator.

2. The electric motor drive of claim 1, wherein said at least one supporting bracket is configured to have at least one connection surface configured to hold at least one of knife plates, rotary rippers and choppers.

3. The electric motor drive of claim 1, wherein said plurality of bearings include a first bearing and a second bearing, a distance D being defined as the distance therebetween, that the length of said vacuum belt conveyor pulley defines a length L; wherein D is larger than L.

4. The electric motor drive of claim 3, further comprising at least two flanges, one of said flanges connecting said first bearing to said rotor and an other flange connecting said second bearing to said rotor, said first bearing and said second bearing being bushings which bridge the distance between length L and distance D.

5. The electric motor drive of claim 1, wherein each said at least one supporting bracket is formed double-folded similar to a "Z".

6. A method of constructing an electric motor drive comprising the steps of:
   mounting a stator on a non-rotary shaft;
   positioning a rotor around said stator;
   connecting said rotor to said non-rotary shaft with bearings;
   incorporating a short circuit arrangement into said rotor;
   forming said rotor as a shell of a vacuum belt conveyor pulley;
   providing a stationary vacuum box;
   attaching at least one supporting bracket to said stationary vacuum box; and
   attaching said non-rotary shaft to said at least one supporting bracket;
   wherein said rotor is configured as a functional part of a machine actuator.

* * * * *